United States Patent
Fukuoka

(10) Patent No.: US 11,416,183 B2
(45) Date of Patent: Aug. 16, 2022

(54) IMAGE PROCESSING APPARATUS, CONTROL METHOD, AND STORAGE MEDIUM FOR STORING PROGRAM

(71) Applicant: CANON KABUSHIKI KAISHA, Tokyo (JP)

(72) Inventor: Sho Fukuoka, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/140,162

(22) Filed: Jan. 4, 2021

(65) Prior Publication Data
US 2021/0216253 A1    Jul. 15, 2021

(30) Foreign Application Priority Data

Jan. 9, 2020   (JP) .............................. JP2020-002084

(51) Int. Cl.
*G06F 3/12*    (2006.01)
*G06T 5/00*    (2006.01)

(52) U.S. Cl.
CPC .......... *G06F 3/1208* (2013.01); *G06F 3/1205* (2013.01); *G06F 3/1243* (2013.01); *G06T 5/002* (2013.01)

(58) Field of Classification Search
CPC .... G06F 3/1208; G06F 3/1205; G06F 3/1243; G06F 3/1244; G06F 3/1256; G06F 3/1285; G06T 5/002; G06T 11/60
USPC ...................................................... 358/1.15
See application file for complete search history.

(56) References Cited

U.S. PATENT DOCUMENTS

| | | | |
|---|---|---|---|
| 10,011,387 B1* | 7/2018 | Payauys | G06Q 30/0269 |
| 10,970,017 B2 | 4/2021 | Nakamoto | |
| 2007/0248394 A1* | 10/2007 | Isowa | B41J 3/286 400/76 |
| 2019/0318672 A1* | 10/2019 | Deljou | G09F 15/0012 |
| 2019/0361647 A1 | 11/2019 | Nakamoto | |

FOREIGN PATENT DOCUMENTS

JP    2019-204270 A    11/2019

OTHER PUBLICATIONS

JP 2019-204270 A, [0003], US 2019/0361647 A1.

* cited by examiner

*Primary Examiner* — Neil R McLean
(74) *Attorney, Agent, or Firm* — Venable LLP

(57) ABSTRACT

A control method executed in an image processing apparatus includes generating image data for outputting a printed material which is to be pasted onto a frame, selecting an image, arranging the selected image on at least a front surface area of the image data, specifying image processing to be executed in relation to a side surface area of the image data, and executing specific analysis processing on an area of a range in accordance with the specified image processing. A plurality of image processes includes image arrangement processing for arranging at least a portion of the selected image on the side surface area by enlarging the selected image, and in a case where the specified image processing is the image arrangement processing, the specific analysis processing is executed on the front surface area and the side surface area.

24 Claims, 10 Drawing Sheets

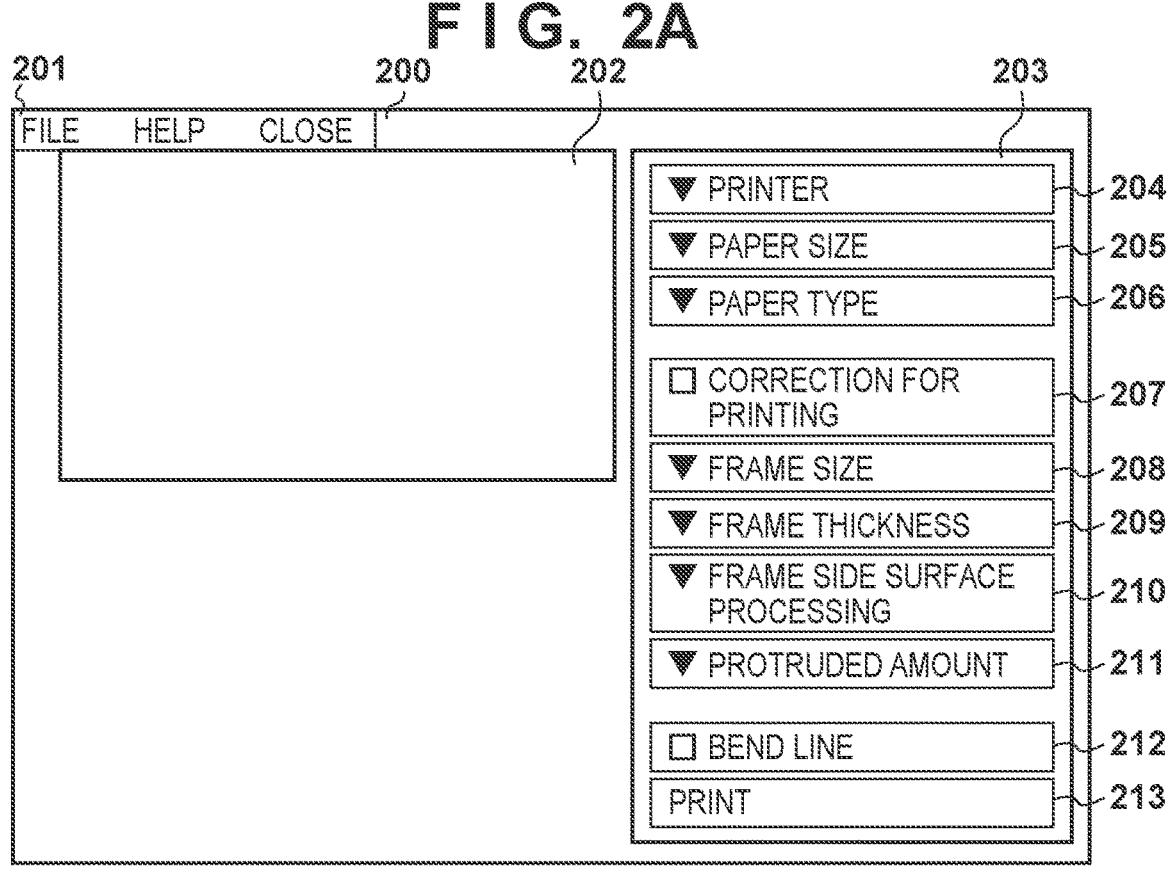
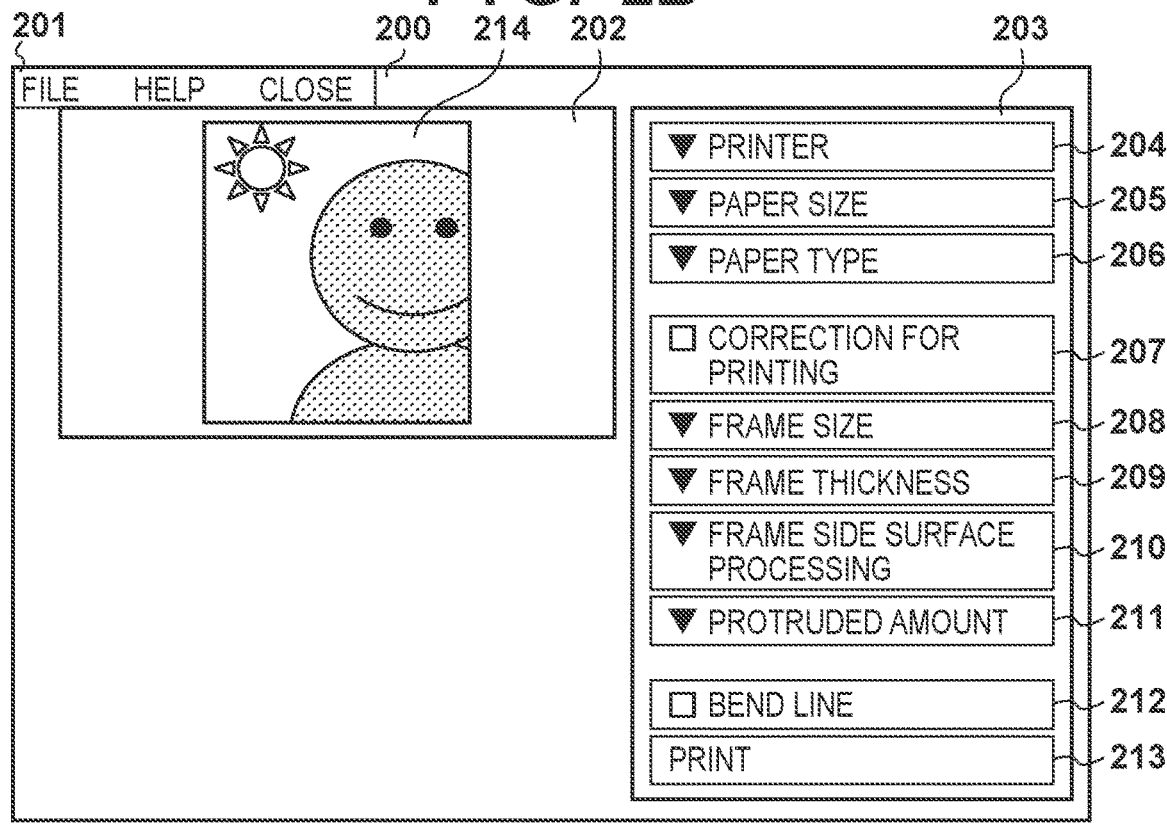

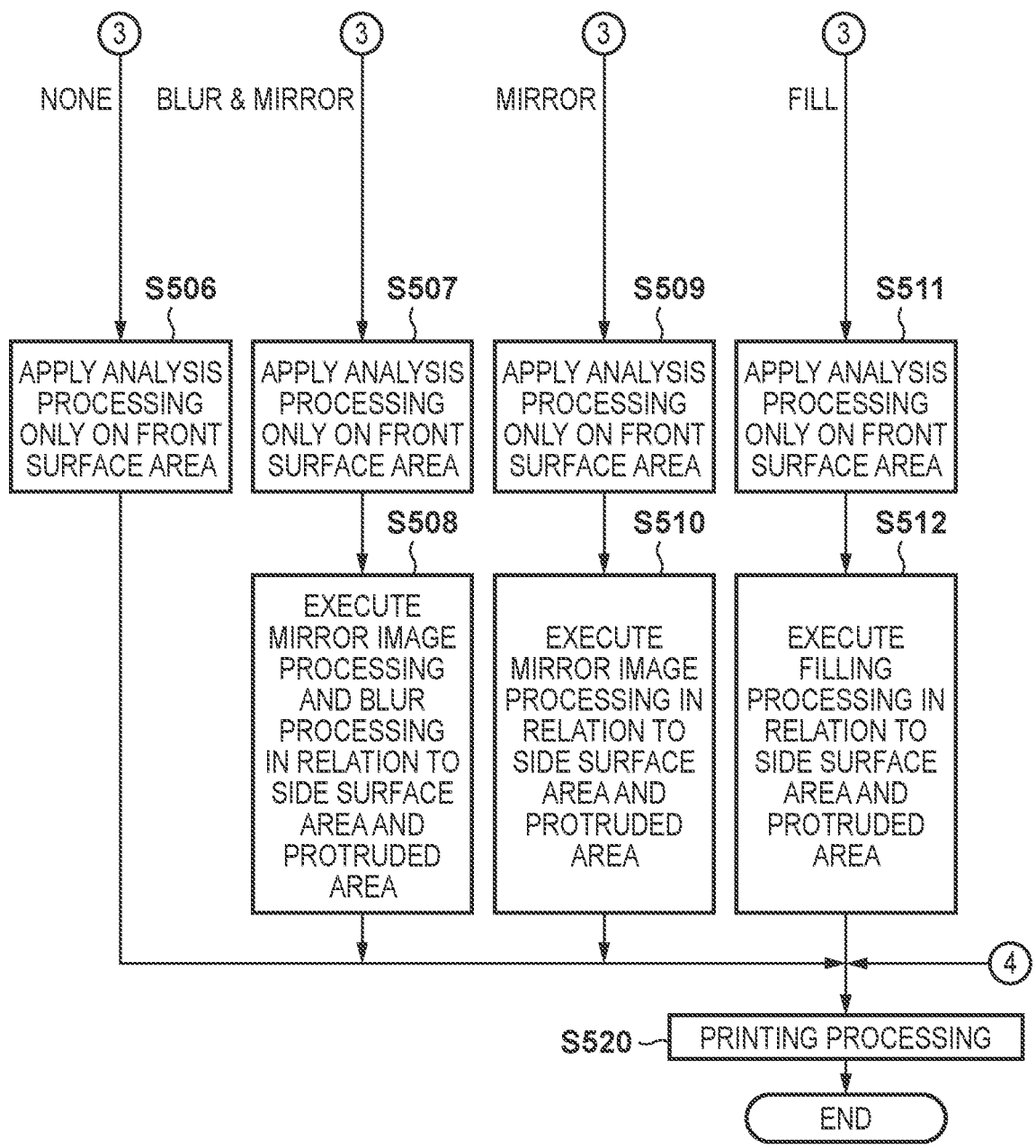

IMAGE PROCESSING APPARATUS, CONTROL METHOD, AND STORAGE MEDIUM FOR STORING PROGRAM

BACKGROUND OF THE INVENTION

Field of the Invention

The present invention is related to an image processing apparatus for processing a print target image, a control method, and a storage medium for storing a program.

Description of the Related Art

A printed material of a form in which the printed material is pasted on a wooden frame for viewing referred to as a so-called gallery wrap or canvas print is known. On such printed materials, an image is arranged at a portion corresponding to a front surface of the frame, and a fill or a mirrored image of the image that is arranged at the portion corresponding to the front surface of the frame is arranged at a portion corresponding to a side surface of the frame, for example.

Japanese Patent Laid-Open No. 2019-204270 describes outputting a printed material for producing a gallery wrap.

SUMMARY OF THE INVENTION

The present invention provides a mechanism that appropriately controls the range in which specific analysis processing is performed for image data in accordance with a setting of an area corresponding to a side surface of a frame in the image data.

The present invention in one aspect provides a control method executed in an image processing apparatus, the method comprising: generating image data for outputting a printed material which is to be pasted onto a frame, wherein the image data includes a front surface area for printing a portion of the printed material which is to be pasted onto a front surface portion of the frame and a side surface area for printing a portion of the printed material which is to be pasted onto a side surface portion of the frame; specifying one of a plurality of image processes as image processing to be executed in relation to the side surface area; executing specific analysis processing on an area of a range in accordance with the specified image processing; and executing output processing for outputting a printed material based on image data generated after the specific analysis processing is executed.

By virtue of the present invention, it is possible to appropriately control the range in which specific analysis processing is performed for image data in accordance with a setting of an area corresponding to a side surface of a frame in the image data.

Further features of the present invention will become apparent from the following description of exemplary embodiments with reference to the attached drawings.

BRIEF DESCRIPTION OF THE DRAWINGS

FIG. 2A and FIG. 2B are views illustrating a screen displayed by application software.

FIG. 5A and FIG. 5B are flowcharts illustrating a process for controlling a range in which to apply specific analysis processing.

DESCRIPTION OF THE EMBODIMENTS

Figure 1:
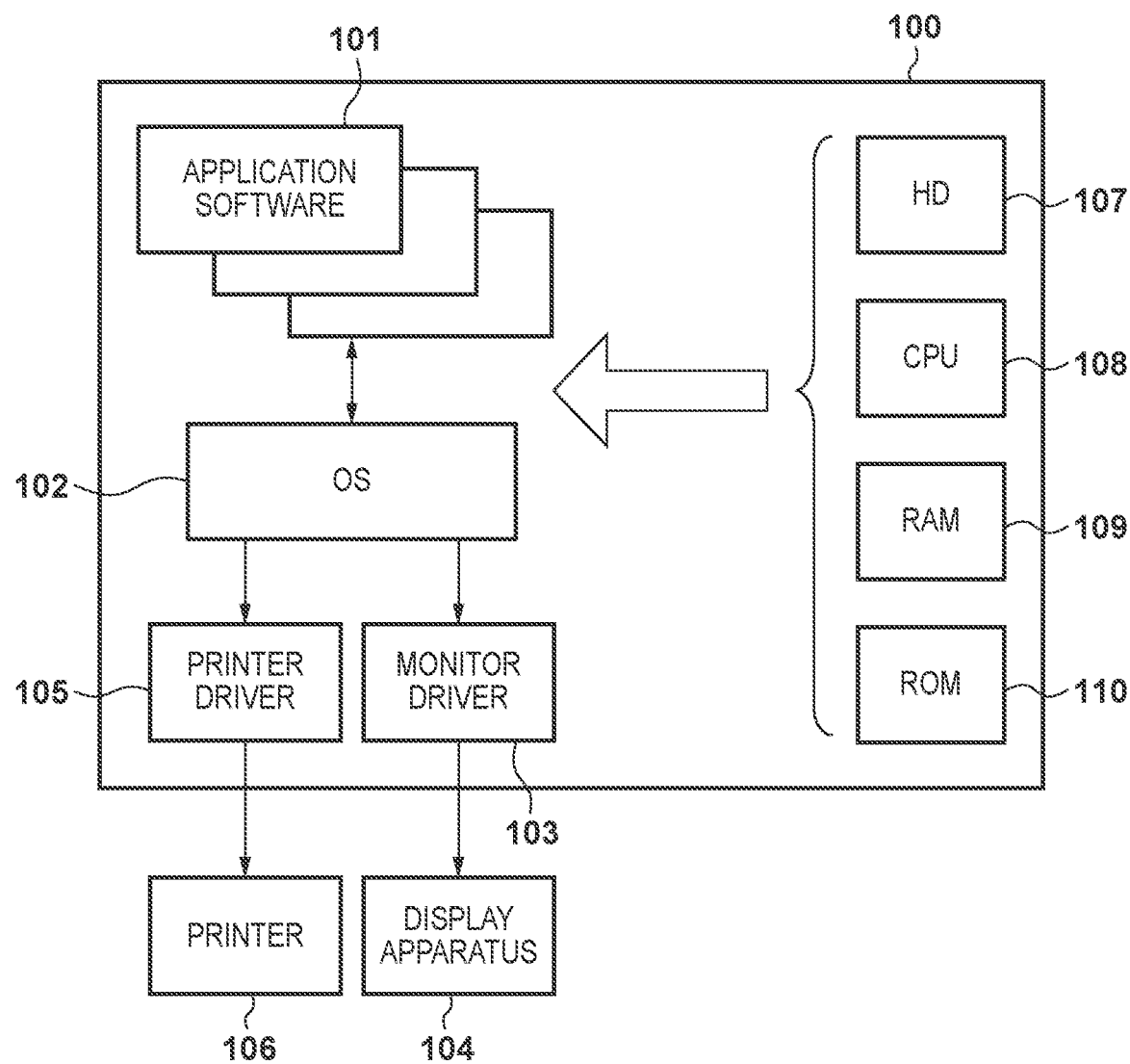
FIG. 1 is a block diagram illustrating a configuration of an image processing system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

In generating print data for outputting a printed material for producing a gallery wrap, specific analysis processing may be executed in relation to image data indicating the image to be arranged on the printed material. Also, it is desirable to appropriately control the range in which specific analysis processing is performed for image data in accordance with image processing on an area corresponding to a side surface of a frame in the image data.

First Embodiment

FIG. 1 is a block diagram illustrating a configuration of an image processing system in the present embodiment. As illustrated in FIG. 1, a main image processing system includes an image processing apparatus 100 and a printer 106. The image processing apparatus 100 can be realized by various forms of apparatuses such as a personal computer, a server, a smart phone, and a tablet terminal. Also, the image processing apparatus 100 comprises application software 101 such as a word processor, a spreadsheet, and an Internet browser. In the present embodiment, the application software 101 is application software for generating a printed material such as a so-called gallery wrap and canvas print, for example. Note that the gallery wrap is an exhibition piece manufactured by folding a peripheral portion of a printed material and wrapping/pasting the printed material onto a frame such as a wooden frame. The application software 101 comprises a function for performing image processing in relation to print target image data, a layout editing function for arranging images on pages, and a print function for the printer 106. Each kind of rendering instruction group (an image rendering instruction, a text rendering instruction, and a graphics rendering instruction) indicating an output image to be issued by the application software 101 is inputted to a monitor driver 103 via an operating system (OS) 102. The monitor driver 103 is software for processing the above rendering instruction groups and displaying images on a display apparatus 104. Also, in a case where printing is performed, such rendering instruction groups are inputted to a printer driver 105 via an OS 102. The printer driver 105 is software for processing such rendering instruction groups to produce print data and for causing the printer 106 to print.

In the image processing apparatus 100, to execute each of the above software, hardware such as a CPU 108, a hard disk (HD) 107, a RAM 109, and a ROM 110 are provided. In the image processing apparatus 100, by the application software 101, output data is produced by using text data classified as text such as letters, graphics data classified as graphics such as shapes, and image data classified as a photographic image. Then, in the display apparatus 104, display is performed based on the output data. Also, in a case where images are printed based on the output data, the application software 101 requests for a print output to the OS 102. Then, the application software 101 issues, to the OS 102, a rendering instruction group, in which a text data portion is configured by text rendering instructions, a graphics data portion is configured by graphics rendering instructions, and an image data portion is configured by image rendering instructions.

The printer 106 is a printing apparatus which prints images on a printing medium by various printing methods such as an inkjet printing method and an electrographic method. The image processing apparatus 100 and the printer 106 may be connected via the network, or may be connected directly by a cable. The network includes a wired communication network, a wireless communication network, or both. Also, the display apparatus 104 may be provided outside the image processing apparatus 100, or may be provided with the image processing apparatus 100 as an integrated type.

FIG. 2A is a view illustrating an example of a screen displayed by the application software 101. A screen 200 is displayed by activation of an application in accordance with an operation that is related to an icon displayed on the display apparatus 104, for example. A user can execute various settings and printing by the screen 200, for example, for a canvas print. The screen 200 includes a menu operation portion 201, a preview area 202, and a setting area 203. Also, the setting area 203 includes a printer selection pull-down 204, a paper size selection pull-down 205, and a paper type selection pull-down 206. Also, the setting area 203 includes a check box 207, a frame size selection pull-down 208, a frame thickness selection pull-down 209, a frame side surface processing selection pull-down 210 and a protruded amount selection pull-down 211. Also, the setting area 203 includes a check box 212 and a print button 213.

The menu operation portion 201 accepts selection of items such as for closing the application software 101, for designating an image to add to a page, and for displaying help. Each function is executed by the application software 101 when the user selects a command displayed on the menu operation portion 201. For example, the user can select an image arranged on the preview area 202 from a file menu of the menu operation portion 201. In the present embodiment, although the image arranged on the preview area 202 is selected from images stored in a storage unit such as the ROM 110, an alternative image (for example, an image on the communication network and an image stored in an external storage) may be selected. Hereinafter, an image selected in this manner is referred to as a selected image. The selected image is arranged on the preview area 202. The preview area 202 displays the selected image described above. Also, in the preview area 202, an amount of change in the pixel value, such as a change in density, in a result of image processing can be displayed. In a case where editing of an image by a user is completed and a print instruction is performed, the image displayed in the preview area 202 is printed.

The printer selection pull-down 204 accepts selection of a printer for executing printing. A selection candidate printer displayed in the printer selection pull-down 204 is a printer which is connected to the image processing apparatus 100 in a wired or wireless manner and searched by the image processing apparatus 100. The paper size selection pull-down 205 accepts selection of paper size. A selection candidate paper size displayed in the paper size selection pull-down 205 is a size of printing paper which can be printed by the printer 106 selected by the printer selection pull-down 204. The paper type selection pull-down 206 accepts selection of type of paper such as a plain paper, a glossy paper, and a photograph paper. A selection candidate paper type displayed in the paper type selection pull-down 206 is a type of printing paper which can be printed by the printer 106 selected by the printer selection pull-down 204.

The check box 207 is a check box for setting whether or not specific analysis processing of correction for printing is applied. Specific analysis processing here is processing to analyze the luminance value of each pixel included in an area of the range to be a target of specific analysis processing. The processing, in a case where luminance values which cannot be represented by printing by the printer 106 are included, changes the luminance value of each pixel included in an area of the range to be a target of the specific analysis processing so that the luminance values become luminance values that can be represented by printing by the printer 106. Note that, at this time, not only the luminance value of pixels comprising luminance values which cannot be represented by printing by the printer 106, but also that of other pixels are changed. For example, the luminance values of all the pixels included in an area of the range to be a target of specific analysis processing are changed so as to maintain the tones which were represented in the original distribution of luminance values of the area of the range to be the target of specific analysis processing. Also, in a case where no luminance value which cannot be represented by printing by the printer 106 is included, the luminance values are not changed. Also, a luminance value which cannot be represented by printing by the printer 106 is, for example, a luminance value exceeding an upper limit value (a first threshold value) and a luminance value lower than a lower limit value (a second threshold value). Also, in the processing executed in a case where an input with respect to the check box 207 is performed, not only one type of processing, but a plurality of types of processing may be included. According to a check in the check box 207, an instruction to set a range in which to apply specific analysis processing is accepted.

The frame size selection pull-down 208 accepts selection of a size of a front surface of a frame which is a pasting target of a printed material. Here, the frame indicates a frame in which a printed material for the gallery wrap is pasted. Generally, a wooden frame is used as a frame, but the material of the frame may be something other than wood. For example, a size such as height 310×width 311 is selected. The value that is inputted here corresponds to a size of an area corresponding to a front surface of a frame in a printed material (hereinafter, a front surface portion in a printed material). The frame thickness selection pull-down 209 accepts selection of a thickness of a side surface of a frame which is a pasting target of a printed material. The value that is inputted here corresponds to a size of an area corresponding to a side surface of a frame in a printed material (hereinafter, a side surface area in a printed material). Note that, in a case where a value 0 is input here, the print data for printing a portion corresponding to a front surface area in a printed material is generated, but the print data for printing a portion corresponding to a side surface area in a printed material is not generated. A printed material produced in such a setting is exhibited, in general, not as a gallery wrap, but as a flat surface printed material. However, the printed material produced in this manner may be pasted to a frame. In such a case, at the side surface portions, the frame is exposed.

A processing selection pull-down 210 accepts selection of image processing performed on an area within the image data (hereinafter, referred to as the side surface area in the image data) corresponding to the side surface area in the printed material. Note that, the side surface area in the image data is printed to the side surface area on a printed material. Image processing is, for example, image arrangement processing, mirror image processing, blur processing, blur and mirror image processing, and filling processing.

Figure 3:
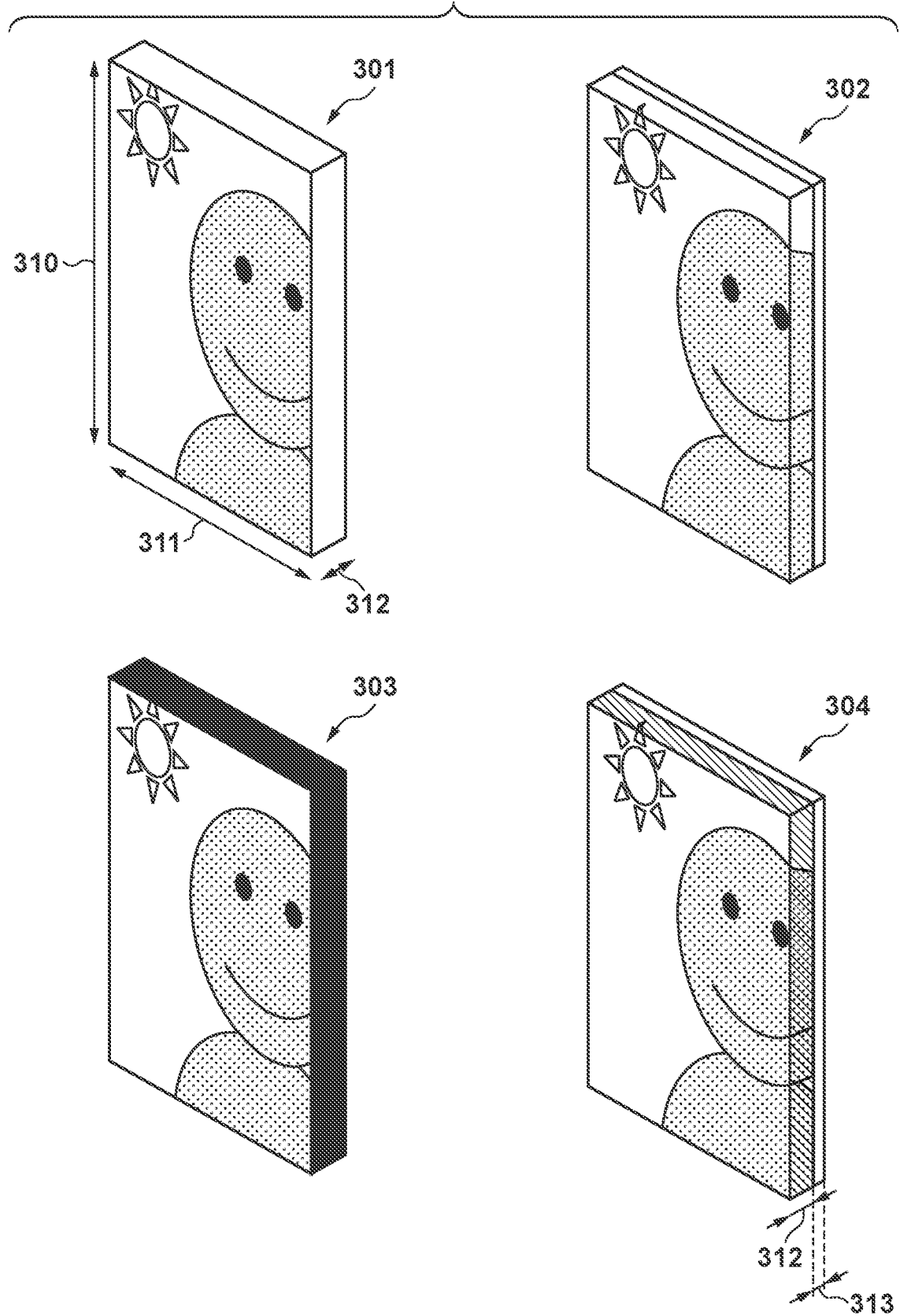
FIG. 3 is a view illustrating an example of an appearance of a gallery wrap.

The image arrangement processing is processing to arrange a part of an area of a selected image on a side surface area in the image data. Specifically, it is processing for enlarging, to the edge of the side surface area in the image data, the selected image that is arranged in an area (hereinafter, front surface area in the image data) within the image data corresponding to the front surface area on the printed material. Furthermore, it is processing for arranging a selected image on the side surface area in the image data so that the outer side portion of the selected image is positioned at the side surface area in the image data. An example of an appearance of a gallery wrap produced in a case where the image arrangement processing is selected is an appearance 302 in FIG. 3. In the appearance 302, the selected image is printed not only on the front surface area of the printed material, but also on the side surface areas of the printed material.

The mirror image processing is processing to arrange a part of a selected image on a side surface area in the image data. In the mirror image processing, the entire selected image is arranged to fit on the front surface area in the image data. Then, image resulting from mirroring and inverting the extracted outer side portion of the selected image that is fit into the front surface area is arranged on the side surface area in the image data.

The blur processing is processing to blur the image arranged in the side surface area in the image data. Note that, in blur processing, a part of the selected image is arranged in a side surface area in the image data similarly to the image arrangement processing. Also, in the blur processing, on the selected image, a portion to be arranged on the front surface area is not blurred. An example of an appearance of the gallery wrap produced in a case where the blur processing is selected is an appearance 304 in FIG. 3. In the appearance 304, the selected image is printed not only on the front surface area of the printed material, but also on the side surface areas of the printed material. Also, on a side surface area of a printed material, a selected image subjected to the blur processing is printed.

The blur and mirror image processing is processing to blur an image arranged on a side surface area in the image data by the mirror image processing. Also, here, the image arranged in the front surface area in the image data is not blurred.

The filling processing is processing to fill in the side surface area in the image data with a predetermined color. Note that, in the filling processing, an image arranged on a front surface area in the image data is not enlarged. In other words, the selected image is not arranged on the side surface area and is arranged so that the entire selected image fits in the front surface area in the image data. Note that, the color that is used for filling is not particularly limited and may be selectable by the user as desired. An example of an appearance of a gallery wrap produced in a case where the filling processing is selected is an appearance 303 in FIG. 3. In the appearance 303, a selected image is printed on a front surface area of a printed material. Then, a side surface area of a printed material is filled by a specific color.

Note that, in the processing selection pull-down 210, a selection item for not executing the image processing may be included. In a case where that selection item is selected, a selected image is not arranged on a side surface area in image data, and the selected image is arranged so as to fit in the front surface area in the image data. In other words, on the printed material outputted in such a case, the side surface area is a margin area and an image is printed only on the front surface area. An example of an appearance of a gallery wrap produced in a case where the image processing is executed is an appearance 301 in FIG. 3. In the appearance 301, a selected image is printed on a front surface area of a printed material and not printed on a side surface area of a printed material. Note that the same printed material may be outputted in a case where filling is selected as image processing and white is selected as a color to be used for the filling, for example. Note that processing other than that described above may be selectable as image processing to be performed in relation to the side surface area.

The protruded amount selection pull-down 211 accepts selection of a protruded amount. Here, a protruded amount is an area that is even further to the outside from the side surface area on a printed material and is an amount of thickness of a portion that corresponds to an area that is wrapped behind the frame (hereinafter, the protruded area on a printed material). Note that configuration may be such that the embodiment does not have the protruded amount selection pull-down 211. In the first embodiment, processing to be executed in a case in which 0 is selected in the protruded amount selection pull-down 211 or in a case that does not have the protruded amount selection pull-down 211 will be described.

A configuration may be taken so that the portions that are indicated as a pull-down in FIG. 2A accept other input methods. For example, a configuration may be taken so as to accept an input using a text box. The check box 212 accepts a setting for whether or not to print a bend line. A bend line is a line for indicating a position where the printed material is to be bent when pasting the printed material onto a frame. If the check box 212 is checked, a setting is made so as to print a bend line for pasting printing paper onto the side surface of a frame and if it is not checked, a setting is made so as not to print a bend line. Note that, configuration may be taken so that lines to be printed in a case where an input is performed in the check box 212 are not only bend lines but also include a cutting line for indicating a position where the printed material is to be cut when pasting the printed material onto a frame. The print button 213 accepts an instruction to execute printing. In a case where the print button 213 is pressed, processing for printing the image that is displayed on the preview area 202 is started in accordance with what is set by the printer selection pull-down 204 to the check box 212. FIG. 2B is a view illustrating an example in which an image 214 is displayed on the preview area 202.

As described above in the present embodiment, in a case where the check box 207 is checked, specific analysis processing will be executed. However, in a case where specific analysis processing is executed in relation to an area that does not need analysis, that produces unnecessary analysis time. An area that does not need analysis is an area on which a selected image is not arranged, for example. Also, in a case where specific analysis processing ends up being executed in relation to an area that is the cause of decreased accuracy of analysis, the accuracy of analysis decreases. An area that is the cause of decreased accuracy of analysis is specifically, an area in which filling processing is performed, for example. Therefore, it is advantageous for the range of an area in which to apply specific analysis processing to be controlled appropriately.

Accordingly, hereinafter, processing for changing a range in which to apply specific analysis processing in the present embodiment will be described.

Figure 4A:
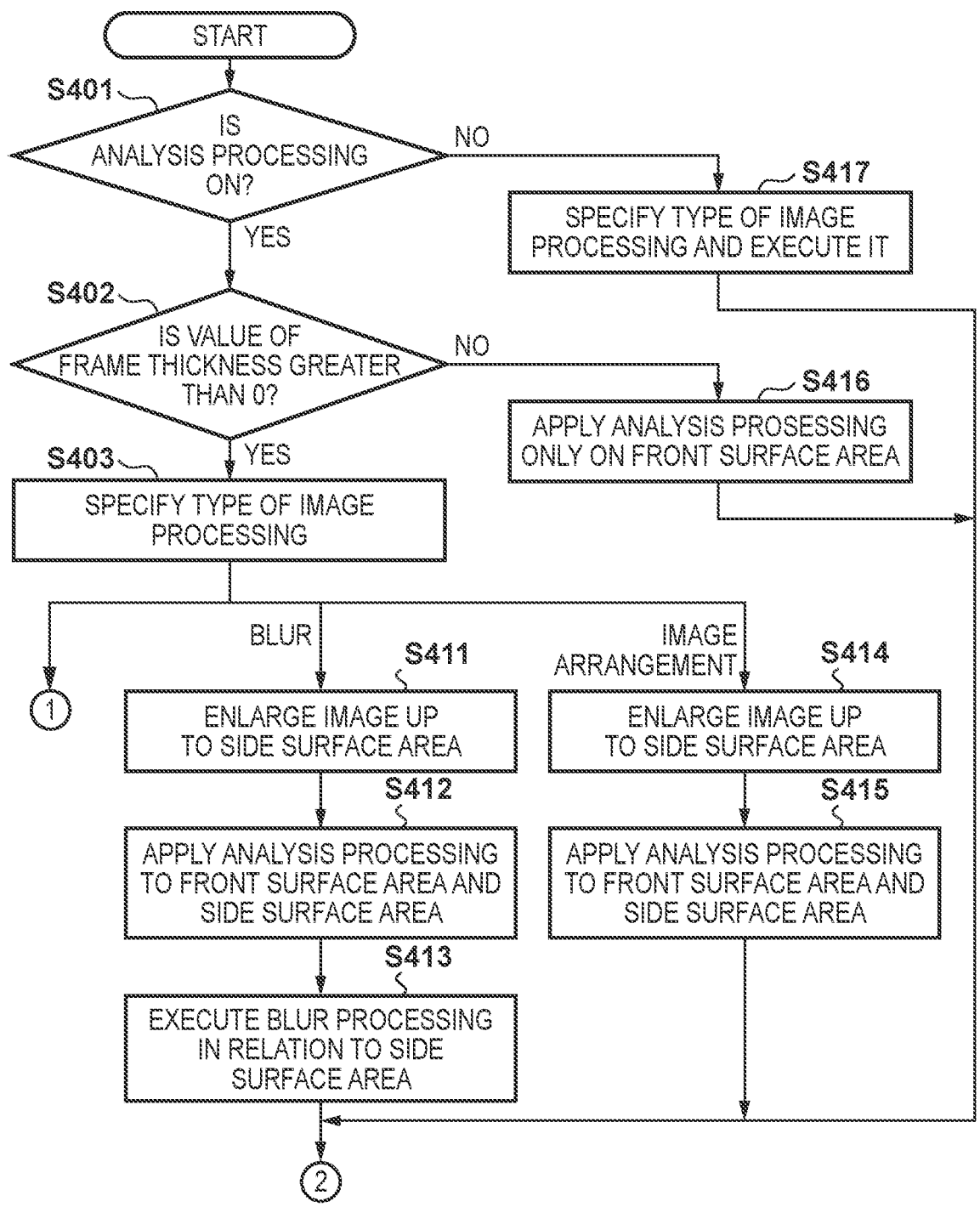
FIG. 4A and FIG. 4B are flowcharts illustrating a process for controlling a range in which to apply specific analysis processing.
Figure 4B:
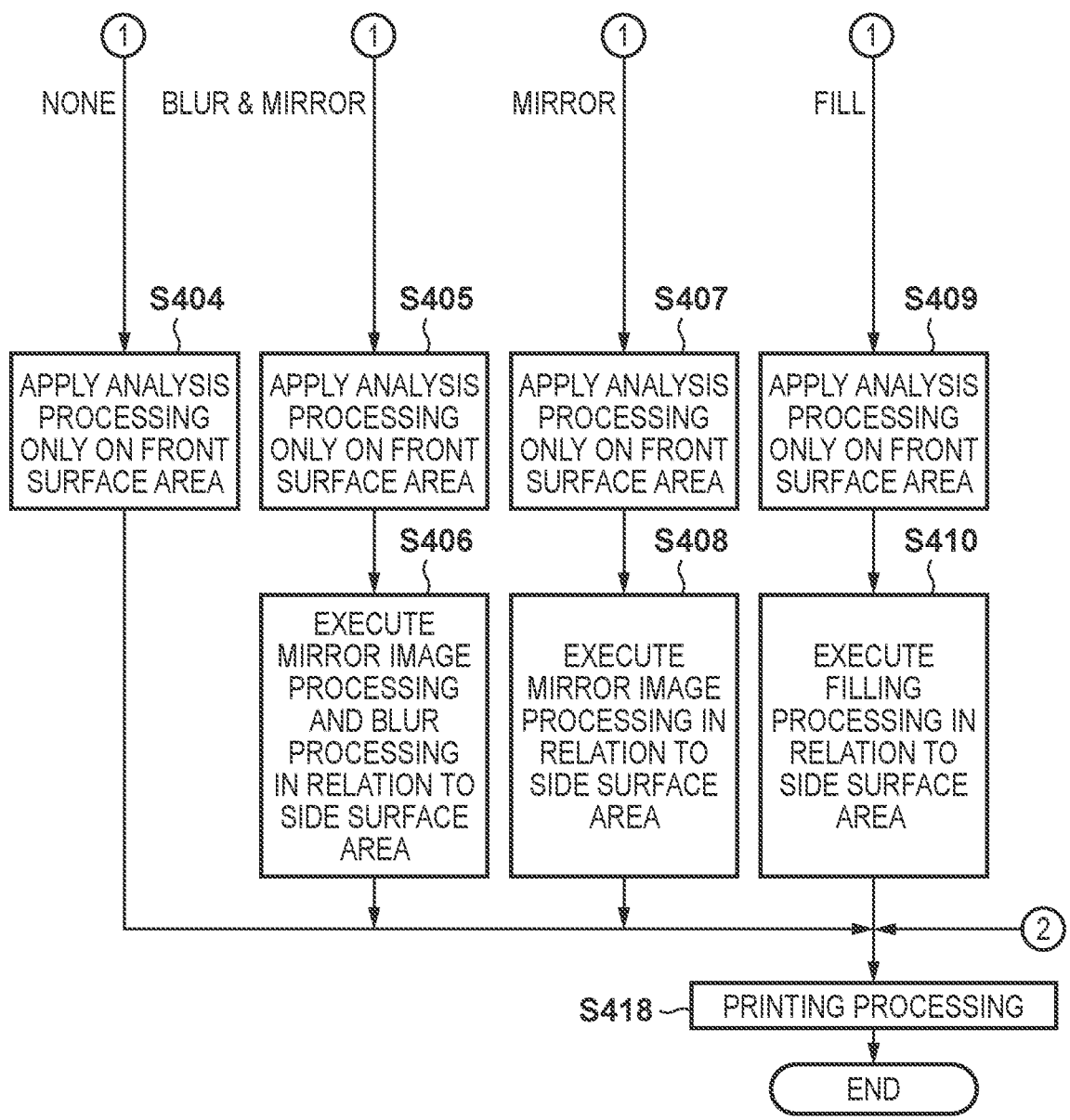

FIG. 4A and FIG. 4B are flowcharts illustrating a process for controlling a range in which to apply specific analysis processing. Processing in FIG. 4A and FIG. 4B are realized by the CPU 108 reading out a program that is stored in the ROM 110 into the RAM 109 and then executing it, for example. Note that, for example, processing in FIG. 4A and FIG. 4B is realized by the application software 101 being read out and then executed. The processing in FIG. 4A and FIG. 4B starts when the print button 213 is pressed.

In step S401, the CPU 108 determines whether or not specific analysis processing is set to be applied. For example, the determination in step S401 is performed based on whether or not the check box 207 in FIG. 2A is checked. Note that a configuration may be taken so as to perform a determination by control that is different from the present embodiment or by another method within the application software 101. In a case where it is determined that the specific analysis processing is set to be applied in step S401, the processing proceeds to step S402 and in a case where it is determined that the specific analysis processing is not set to be applied in step S401, the processing proceeds to step S417.

In step S402, the CPU 108 determines whether or not the value that is set in the frame thickness selection pull-down 209 is greater than 0. The CPU 108, in a case where it determines that it is greater than 0, proceeds to step S403 and in a case where it determines that it is not greater than 0, proceeds to step S416.

In step S403, the CPU 108 specifies the type of image processing that is selected by the processing selection pull-down 210. The CPU 108, in case where a selection item for not executing image processing is selected and image processing is not instructed in the first place, proceeds to step S404. Also, the CPU 108, in a case where blur and mirror image processing are specified in step S403, proceeds to step S405. Also, the CPU 108, in a case where mirror image processing is specified in step S403, proceeds to step S407. Also, the CPU 108, in a case where filling processing is specified in step S403, proceeds to step S409. Also, the CPU 108, in a case where blur processing is specified in step S403, proceeds to step S411. Also, the CPU 108 in a case where image arrangement processing is specified in step S403, proceeds to step S414.

In step S404, the CPU 108 executes specific analysis processing only on the front surface area of image data. Then, the CPU 108 advances the processing to step S418.

In step S405, the CPU 108 executes specific analysis processing only on the front surface area of image data. Then, the CPU 108 executes blur and mirror image processing in relation to the side surface area of image data in step S406. Then, the CPU 108 proceeds with the processing to step S418.

In step S407, the CPU 108 executes specific analysis processing only on the front surface area of image data. Then, the CPU 108 executes mirror image processing in relation to the side surface area of image data in step S408. Then, the CPU 108 advances the processing to step S418.

As described above, in the present embodiment, in a case blur and mirror image processing or mirror image processing is specified as the image processing to be executed in relation to the side surface area in the image data, specific analysis processing is executed only on the front surface area in the image data. Then, after the specific analysis processing is executed in the front surface area in the image data, the mirror image processing is executed. By this, an image to be arranged in the side surface area by the mirror image processing is an image on which specific analysis processing has already been performed. Note that the embodiment may be configured so as to execute specific analysis processing on both the front surface area and the side surface area after the mirror image processing is executed. However, it becomes possible to reduce the range in which the specific analysis processing is applied by configuring an embodiment in which the mirror image processing is executed after specific analysis processing is executed on the front surface area in the image data.

In step S409, the CPU 108 executes specific analysis processing only on the front surface area of image data. Then, the CPU 108 executes filling processing in relation to the side surface area of image data in step S410. Then, the CPU 108 advances the processing to step S418.

In step S411, the CPU 108 enlarges the selected image arranged in the image data up to the edge of the side surface area in the image data. Then, the CPU 108, in step S412, executes specific analysis processing in relation to the front surface area and the side surface area in the image data. Then, the CPU 108 executes blur processing in relation to the side surface area of image data in step S413. Then, the CPU 108 advances the processing to step S418.

As described above, in the present embodiment, in a case where the blur processing is specified as image processing to be executed in relation to the side surface area, the specific analysis processing would be executed after the arrangement of the image (enlarging of an image) that is to correspond to the side surface area is performed and before the blur processing is performed in relation to the side surface area. By this, it becomes possible to execute specific analysis processing before the luminance value of each pixel changes due to blur processing and to analyze the luminance value of each pixel more accurately.

In step S414, the CPU 108 enlarges the selected image arranged in the image data up to the edge of the side surface area in the image data. Then, the CPU 108, in step S415, executes specific analysis processing in relation to the front surface area and the side surface area in the image data. After that, the CPU 108 advances the processing to step S418.

In step S416, the CPU 108 executes specific analysis processing only on the front surface area of image data. Then, the CPU 108 advances the processing to step S418. In step S417, the CPU 108 specifies the type of image processing selected by the processing selection pull-down 210 and then executes the specified processing in relation to the side surface area in the image data. In this case, specific analysis processing is not executed. Then, the CPU 108 advances the processing to step S418.

In step S418, the CPU 108 performs printing processing as processing for outputting image data. Printing processing is processing for outputting, as a printed material, image data displayed in the preview area 202. Printing processing includes general image processing such as processing for converting the color space of image data and processing for changing the resolution or the number of pixels of image data, for example. Note that in a case where the determination result is YES in step S401, the image data from after specific analysis processing is applied becomes a target of image processing in the printing processing. Meanwhile, in a case where the determination result is NO in step S401, image data for which the specific analysis processing has not been applied becomes the target of image processing in the printing processing. In other words, even if the determination result is NO in step S401, general image processing that is not specific analysis processing is executed in relation to the image data. Also, general image processing that is not specific analysis processing is executed in relation to the entire area included in the image data. Also, printing processing includes processing for transmitting to the printer 106 the image data (print data) on which the above general image processing is applied. Then, the CPU 108 ends the processing in FIG. 4A and FIG. 4B.

As described above, in the present embodiment, the range in which specific analysis processing is executed is changed in accordance with which image processing is executed in relation to the side surface area in the image data. In other words, the range in which specific analysis processing is executed is changed in accordance with a setting that is related to the side surface area in the image data. In the present embodiment, it becomes possible to reduce the time it takes for the specific analysis processing by preventing the execution of specific analysis processing on unnecessary portions. Also, it becomes possible to prevent the accuracy of analysis from decreasing by preventing the execution of specific analysis processing on portions that cause the accuracy of analysis to decrease.

Figure 6:
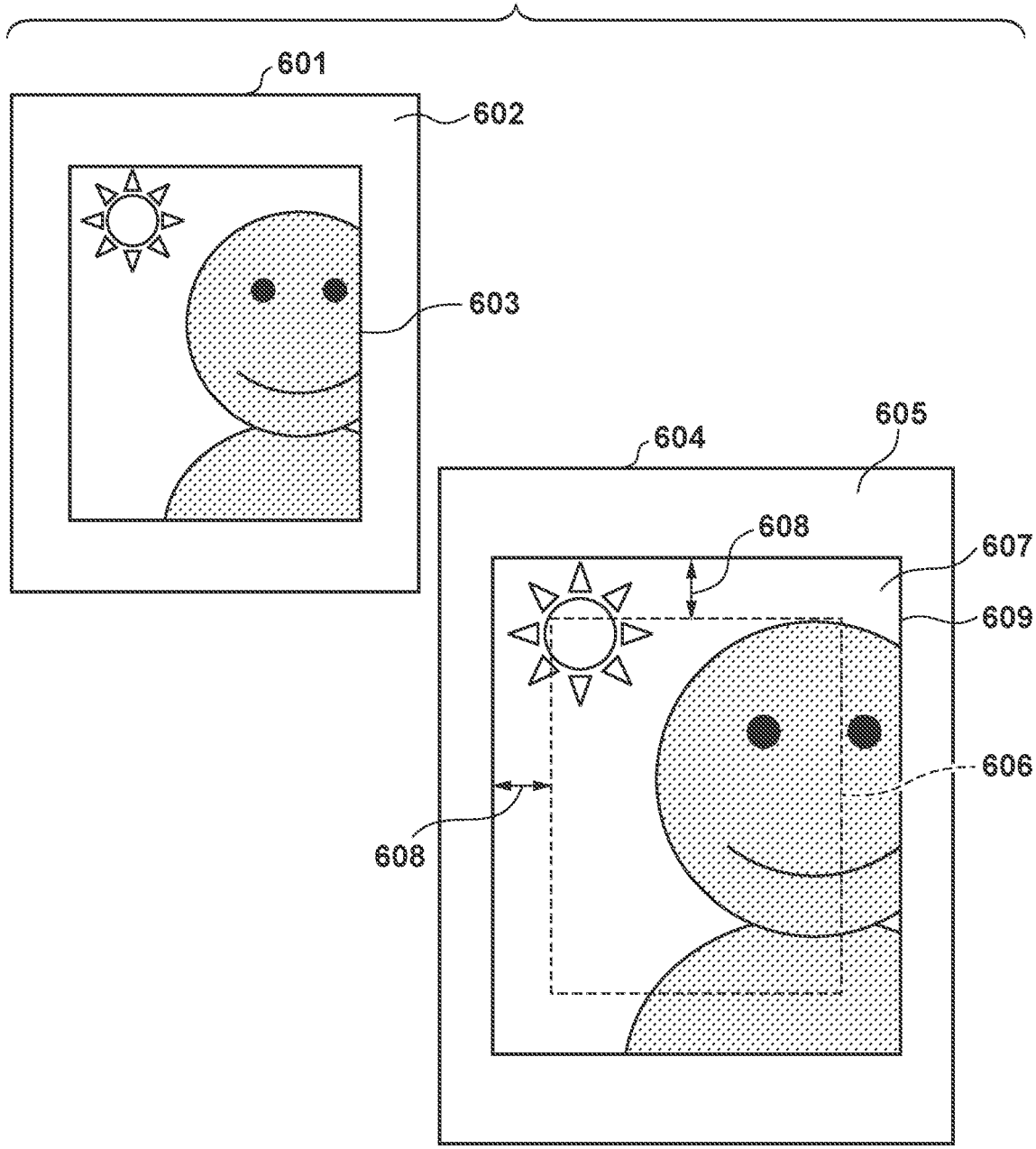
FIG. 6 is a view illustrating a printed material to be outputted.
Figure 8:
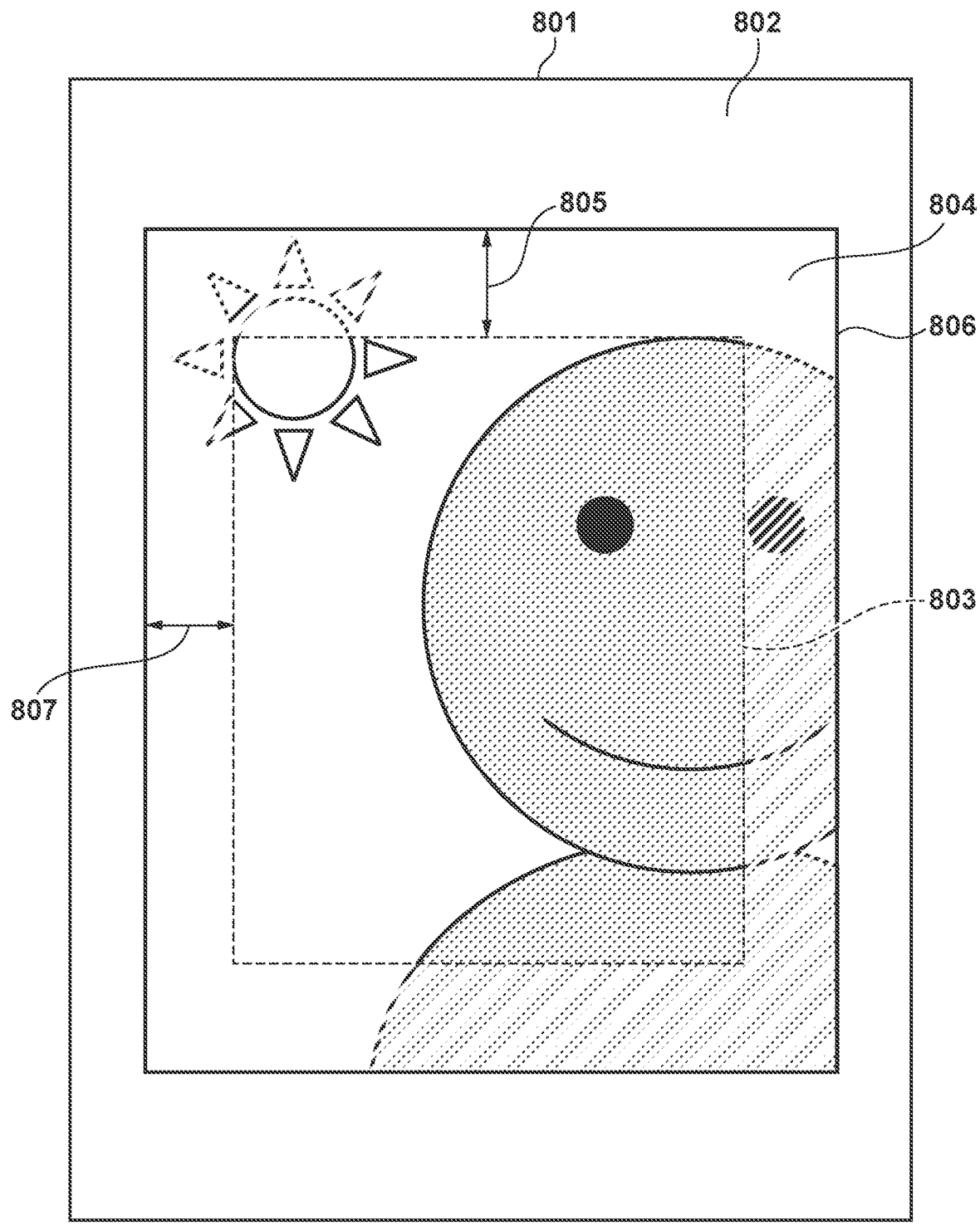
FIG. 8 is a view illustrating a printed material to be outputted.

FIG. 6 and FIG. 8 are views illustrating a printed material to be outputted by processing in the present embodiment. A printed material 601 is a printed material to be outputted in a case where 0 is set in the frame thickness selection pull-down 209. In such a case, the selected image is printed only on a front surface area 603 in the printed material. In the present embodiment, the image based on the image data generated by the processing in FIG. 4A and FIG. 4B is printed on paper that is larger than the size of the image. Therefore, an area 602 is a margin area on paper. The user produces an exhibition piece by cutting out the front surface area 603 from the printed material 601.

A printed material 604 is a printed material that is outputted in a case where 1 or more is set by the frame thickness selection pull-down 209 and the image arrangement processing is set by the processing selection pull-down 210. In such a case, the selected image is printed so as to straddle a front surface area 606 and a side surface area 607 in the printed material. A thickness 608 corresponds to a value that is inputted by the frame thickness selection pull-down 209. The entirety of the image based on the image data that is generated by the processing in FIG. 4A and FIG. 4B corresponds to an area 609. Therefore, an area 605 is a margin area on paper. The user produces an exhibition piece by cutting out the area 609 from the printed material 604 and then pasting it onto a frame.

A printed material 801 is a printed material that is outputted in a case where 1 or more is set by the frame thickness selection pull-down 209 and the blur processing is set by the processing selection pull-down 210. In such a case, the selected image is printed so as to straddle a front surface area 803 and a side surface area 804 in the printed material. A thickness 805 corresponds to a value that is inputted by the frame thickness selection pull-down 209. The entirety of the image based on the image data that is generated by the processing in FIG. 4A and FIG. 4B corresponds to an area 806. Therefore, an area 802 is a margin area on paper. The user produces an exhibition piece by cutting out the area 806 from the printed material 801 and then pasting it onto a frame.

Second Embodiment

Hereinafter, regarding the second embodiment, a description will be given of points different from the first embodiment. In the first embodiment, processing to be executed in a case in which 0 is selected in the protruded amount selection pull-down 211 or in a case that does not have the protruded amount selection pull-down 211 was described. In the present embodiment, a case in which a value that is greater than 0 is selected in the protruded amount selection pull-down 211 will be described. Note that in a case where a value that is greater than 0 is selected in the protruded amount selection pull-down 211, image processing is executed in relation to not only the side surface area in the image data but also the protruded area in the image data.

Specifically, in the image arrangement processing, the selected image is enlarged up to the edge of the protruded area. In other words, the selected image is arranged so that the outer side portion of the selected image is positioned in the side surface area and the protruded area in the image data. Then, image resulting from mirroring and inverting the extracted outer side portion of the selected image that is fit into the front surface area in the mirror image processing is arranged so as to straddle the side surface area and the protruded area in the image data. Also, in blur processing, a part of the selected image is arranged in a side surface area and the protruded area in the image data similarly to the image arrangement processing. Then, an image that is arranged in the side surface area and the protruded area in the image data is blurred. Also, in the blur and mirror image processing, an image that is arranged in the side surface area and the protruded area in the image data is blurred by the mirror image processing. Also, in the filling processing, the side surface area and the protruded area in the image data are filled with a specific color.

Figure 5A:
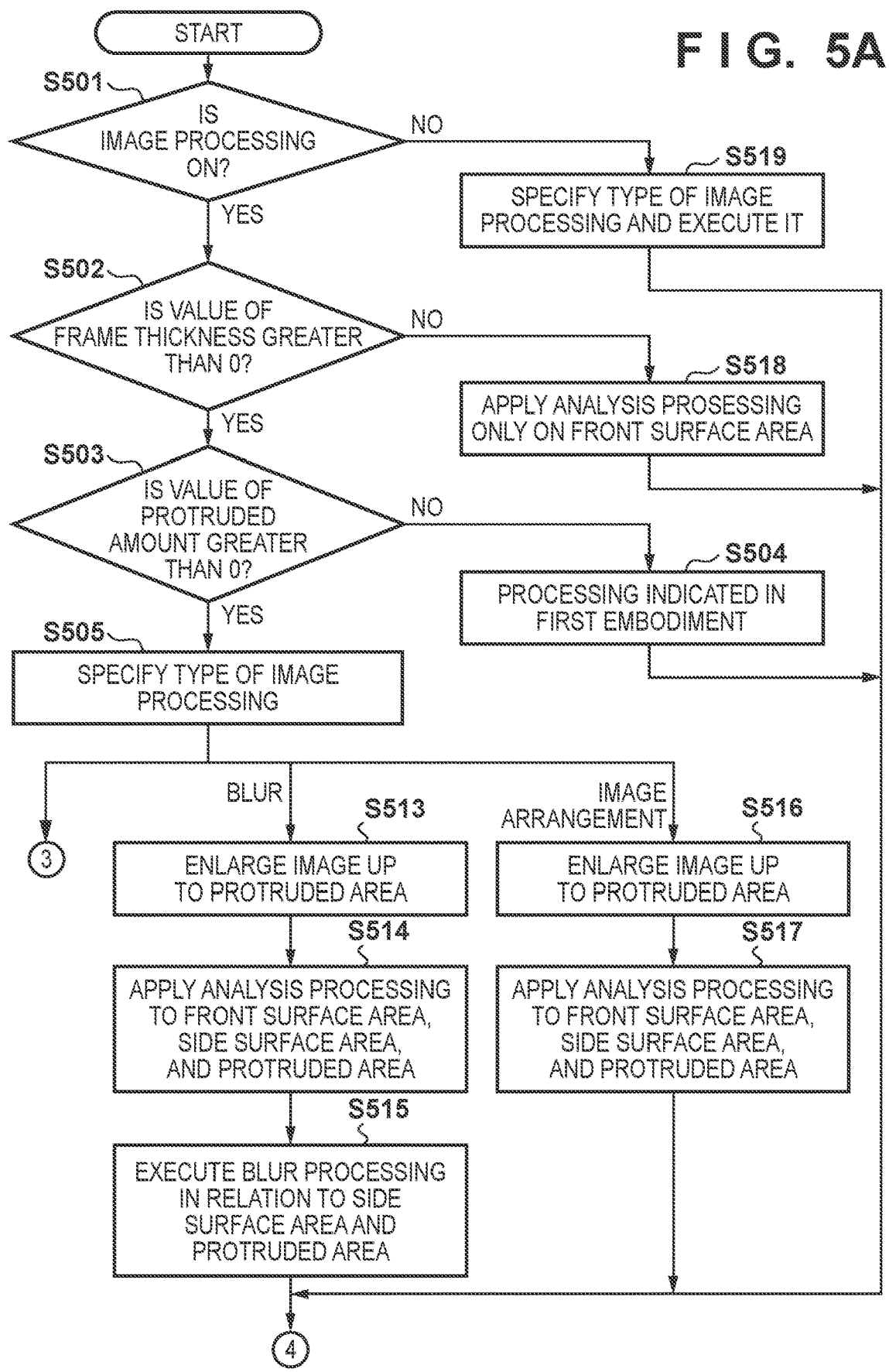

FIG. 5A and FIG. 5B are flowcharts illustrating a process for controlling a range in which to apply specific analysis processing. Processing in FIG. 5A and FIG. 5B is realized by the CPU 108 reading out a program that is stored in the ROM 110 into the RAM 109 and then executing it, for example. Note that, for example, processing in FIG. 5A and FIG. 5B is realized by the application software 101 being read out and then executed.

Steps S501 and S502 are the same as steps S401 and S402, and therefore description thereof will be omitted.

In a case where a value that is set in the frame thickness selection pull-down 209 is determined to be greater than 0 in step S502, the CPU 108, in step S503, determines whether or not a value that is set in the protruded amount selection pull-down 211 is greater than 0. The CPU 108, in a case where it determines that the value is greater than 0, proceeds to step S505 and in a case where it determines that the value is not greater than 0, proceeds to step S504. In step S504, processing in step S403 and later which was described in the first embodiment is executed.

Steps S505 to S507 are the same as steps S403 to S405, and therefore description thereof will be omitted. In step S508, the CPU 108 executes blur and mirror image processing in relation to the side surface area and the protruded area in the image data. Then, the CPU 108 advances the processing to step S520.

Step S509 is the same as step S407 and therefore, description thereof will be omitted. Then, the CPU 108, in step S510, executes mirror image processing in relation to the side surface area and the protruded area in the image data. Then, the CPU 108 advances the processing to step S520.

Step S511 is the same as step S409 and therefore, description thereof will be omitted. Then, the CPU 108, in step S512, executes the filling processing in relation to the side surface area and the protruded area in the image data. Then, the CPU 108 advances the processing to step S520.

In step S513, the CPU 108 enlarges the selected image arranged in the image data up to the edge of the protruded area in the image data. Then, the CPU 108, in step S514, executes specific analysis processing in relation to the front surface area, the side surface area, and the protruded area in the image data. Then, the CPU 108, in step S515, executes blur processing in relation to the side surface area and the protruded area in the image data. Then, the CPU 108 advances the processing to step S520.

In step S516, the CPU 108 enlarges the selected image arranged in the image data up to the edge of the protruded area in the image data. Then, the CPU 108, in step S517, executes specific analysis processing in relation to the front surface area, the side surface area, and the protruded area in the image data. Then, the CPU 108 advances the processing to step S520.

Steps S518 to S520 are the same as steps S416 to S418, and therefore description thereof will be omitted.

Figure 7:
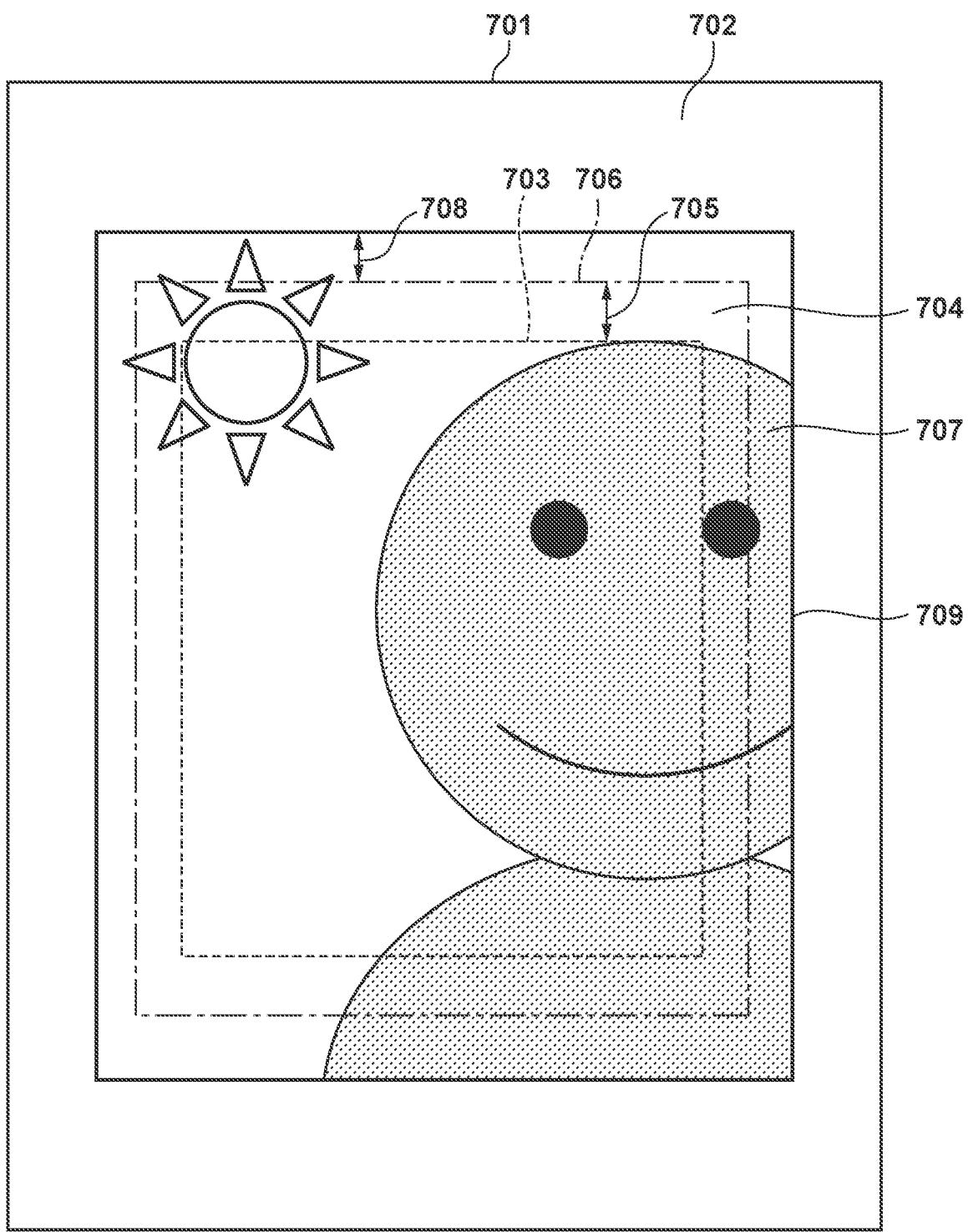
FIG. 7 is a view illustrating a printed material to be outputted.

FIG. 7 is a view illustrating a printed material to be outputted by processing in the present embodiment. A printed material 701 is a printed material that is outputted in a case where 1 or more is set in the frame thickness selection pull-down 209 and the protruded amount selection pull-down 211 and image arrangement processing is set by the processing selection pull-down 210. In such a case, the selected image is printed across a front surface area 703, a side surface area 704, and a protruded area 707 on the printed material. An edge 706 corresponds to the edge of the side surface area 704. A thickness 705 corresponds to a value that is inputted by the frame thickness selection pull-down 209. A thickness 708 corresponds to a value that is inputted by the protruded amount selection pull-down 211. The entirety of the image based on the image data that is generated by the processing in FIG. 5A and FIG. 5B corresponds to an area 709. Therefore, an area 702 is a margin area on paper. The user produces an exhibition piece by cutting out the area 709 from the printed material 701 and then pasting it onto a frame.

As described above, by virtue of the present embodiment, the range in which specific analysis processing is applied is changed appropriately in accordance with a setting that is related to the protruded amount. By doing so, it becomes possible to apply specific analysis processing only on an appropriate range and to improve user convenience.

Other Embodiments

Processing aside from the processing that was described in the above embodiments may be included as image processing that is related to the side surface area in image data. For example, similarly to the image arrangement processing, a portion of the selected image may be arranged in the side surface area in the image data and further, mosaic processing for performing mosaicing in relation to the image that is arranged in the side surface area and the like may be included. In mosaic processing, specific analysis processing is executed on the front surface area and the side surface area in the image data. Also, in mosaic processing, specific analysis processing is executed after a portion of the selected image is arranged on the side surface area in the image data and before mosaicing is performed in relation to the image that is arranged in the side surface area.

In the above embodiments a configuration having control for deciding the setting value of each setting item on the UI screen 200 of the application software 101 was described. However, another configuration may be taken, for example, of a configuration that can accept information from another linked application software or acquire setting information by another desired method.

The present invention is not limited to the above embodiments and various changes and modifications can be made within the spirit and scope of the present invention. Therefore, to apprise the public of the scope of the present invention, the following claims are made.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-002084, filed Jan. 9, 2020, which is hereby incorporated by reference herein in its entirety.

What is claimed is:

1. A control method executed in an image processing apparatus, the method comprising:
   generating image data for outputting a printed material which is to be pasted onto a frame, wherein the image data includes a front surface area for printing a portion of the printed material which is to be pasted onto a front surface portion of the frame and a side surface area for printing a portion of the printed material which is to be pasted onto a side surface portion of the frame;

selecting an image;

arranging the selected image on at least the front surface area;

specifying one of a plurality of image processes as image processing to be executed in relation to the side surface area;

executing specific analysis processing on an area of a range in accordance with the specified image processing; and executing output processing for outputting a printed material based on image data generated after the specific analysis processing is executed, wherein the plurality of image processes includes image arrangement processing for arranging at least a portion of the selected image on the side surface area by enlarging the selected image, and in a case where the specified image processing is the image arrangement processing, the specific analysis processing is executed on the front surface area and the side surface area.

2. The control method according to claim 1, wherein the plurality of image processes includes blur processing for arranging at least a portion of the selected image on the side surface area by enlarging the selected image, and blurring the image arranged in the side surface area, and in a case where the specified image processing is the blur processing, the specific analysis processing is executed on the front surface area and the side surface area.

3. The control method according to claim 2, wherein in a case where the specified image processing is the blur processing, the specific analysis processing is executed after at least a portion of the selected image is arranged on the side surface area by enlarging the selected image and before the image that is arranged on the side surface area is blurred.

4. The control method according to claim 1, wherein the plurality of image processes includes mirror image processing for arranging on the side surface area an image in which at least a portion of the selected image is mirrored and inverted, and in a case where the specified image processing is the mirror image processing, the specific analysis processing is executed on the front surface area and the specific analysis processing is not executed on the side surface area.

5. The control method according to claim 4, wherein in a case where the specified image processing is the mirror image processing, the specific analysis processing is executed on the front surface area after the image is arranged on the front surface area and before the mirror image processing is performed.

6. The control method according to claim 1, wherein the plurality of image processes includes blur and mirror image processing for arranging on the side surface area an image in which at least a portion of the selected image is mirrored and inverted and the image that is arranged on the side surface area is blurred, and in a case where the specified image processing is the blur and mirror image processing, the specific analysis processing is executed on the front surface area and the specific analysis processing is not executed on the side surface area.

7. The control method according to claim 6, wherein in a case where the specified image processing is the blur and mirror image processing, the specific analysis processing is executed on the front surface area after the image is arranged on the front surface area and before the blur and mirror image processing is performed.

8. The control method according to claim 1, wherein the plurality of image processes includes filling processing for filling the side surface area with a predetermined color, and in a case where the specified image processing is the filling processing, the specific analysis processing is executed on the front surface area and the specific analysis processing is not executed on the side surface area.

9. The control method according to claim 1, wherein in a case where none of the plurality of image processes is executed in relation to the side surface area, the specific analysis processing is executed on the front surface area and the specific analysis processing is not executed on the side surface area.

10. The control method according to claim 1, wherein the image data further includes a protruded area which is an area outside the side surface area, and one of the plurality of image processes is specified as image processing to be executed in relation to the side surface area and the protruded area.

11. The control method according to claim 10, wherein the plurality of image processes includes image arrangement processing for arranging at least a portion of the selected image on the side surface area and the protruded area by enlarging the selected image, in a case where the specified image processing is the image arrangement processing, the specific analysis processing is executed on the front surface area, the side surface area, and the protruded area.

12. The control method according to claim 10, wherein the plurality of image processes includes blur processing for arranging at least a portion of the selected image on the side surface area and the protruded area by enlarging the selected image, and blurring the image arranged in the side surface area and the protruded area, and in a case where the specified image processing is the blur processing, the specific analysis processing is executed on the front surface area, the side surface area, and the protruded area.

13. The control method according to claim 10, wherein the plurality of image processes includes mirror image processing for arranging, on the side surface area and the protruded area, an image in which at least a portion of the selected image is mirrored and inverted, and in a case where the specified image processing is the mirror image processing, the specific analysis processing is executed on the front surface area and the specific analysis processing is not executed on the side surface area and the protruded area.

14. The control method according to claim 10, wherein the plurality of image processes includes blur and mirror image processing for arranging on the side surface area and the protruded area an image in which at least a portion of the selected image is mirrored and inverted, and for blurring the image arranged on the side surface area and the protruded area, and in a case where the specified image processing is the blur and mirror image processing, the specific analysis processing is executed on the front surface area and the specific analysis processing is not executed on the side surface area and the protruded area.

15. The control method according to claim 10, wherein the plurality of image processes includes filling processing for filling the side surface area and the protruded area with a predetermined color, and
in a case where the specified image processing is the filling processing, the specific analysis processing is executed on the front surface area and the specific analysis processing is not executed on the side surface area and the protruded area.

16. The control method according to claim 10, wherein in a case where none of the plurality of image processes is executed in relation to the side surface area and the protruded area, the specific analysis processing is executed on the front surface area and the specific analysis processing is not executed on the side surface area and the protruded area.

17. The control method according to claim 1, wherein the specific analysis processing is processing for analyzing a luminance value of a pixel that is included in an area on which the specific analysis processing is to be executed.

18. The control method according to claim 17, further comprising executing change processing for performing a change of a luminance value of a pixel that is included in an area on which the specific analysis processing is performed.

19. The control method according to claim 18, wherein
in a case where a pixel having a luminance value that exceeds a predetermined threshold is included in an area on which the specific analysis processing is executed, the change processing is executed, and
in a case where a pixel having a luminance value that exceeds a predetermined threshold is not included in an area on which the specific analysis processing is executed, the change processing is not executed.

20. The control method according to claim 1, further comprising executing on the front surface area and the side surface area another image process which is different from the specific analysis processing and the plurality of image processes.

21. The control method according to claim 20, wherein the another image process is at least one of processing for changing a color space of an area on which the another image process is to be executed and processing for changing the number of pixels of an area on which the another image process is to be executed.

22. The control method according to claim 1, wherein the output processing includes processing for transmitting to a printer apparatus image data generated after the specific analysis processing is executed.

23. A control method executed in an image processing apparatus, the method comprising:
generating image data for outputting a printed material which is to be pasted onto a frame, wherein the image data includes a front surface area for printing a portion of the printed material which is to be pasted onto a front surface portion of the frame and a side surface area for printing a portion of the printed material which is to be pasted onto a side surface portion of the frame;
selecting an image;
arranging the selected image on at least the front surface area;
specifying one of a plurality of image processes as image processing to be executed in relation to the side surface area;
executing specific analysis processing on an area of a range in accordance with the specified image processing; and
executing output processing for outputting a printed material based on image data generated after the specific analysis processing is executed,
wherein the plurality of image processes includes mirror image processing for arranging on the side surface area an image in which at least a portion of the selected image is mirrored and inverted, and
in a case where the specified image processing is the mirror image processing, the specific analysis processing is executed on the front surface area and the specific analysis processing is not executed on the side surface area.

24. A control method executed in an image processing apparatus, the method comprising:
generating image data for outputting a printed material which is to be pasted onto a frame, wherein the image data includes a front surface area for printing a portion of the printed material which is to be pasted onto a front surface portion of the frame and a side surface area for printing a portion of the printed material which is to be pasted onto a side surface portion of the frame;
selecting an image;
arranging the selected image on at least the front surface area;
specifying one of a plurality of image processes as image processing to be executed in relation to the side surface area;
executing specific analysis processing on an area of a range in accordance with the specified image processing; and
executing output processing for outputting a printed material based on image data generated after the specific analysis processing is executed,
wherein the image data further includes a protruded area which is an area outside the side surface area, and
one of the plurality of image processes is specified as image processing to be executed in relation to the side surface area and the protruded area.

* * * * *